US010712290B2

(12) United States Patent  
Morris (10) Patent No.: US 10,712,290 B2  
(45) Date of Patent: Jul. 14, 2020

(54) TECHNIQUES FOR CONTROL OF NON-DESTRUCTIVE TESTING DEVICES VIA A PROBE DRIVER

(71) Applicant: General Electric Company, Schenectady, NY (US)

(72) Inventor: Bryan Christopher Morris, Baldwinsville, NY (US)

(73) Assignee: General Electric Company, Schenectady, NY (US)

( * ) Notice: Subject to any disclaimer, the term of this patent is extended or adjusted under 35 U.S.C. 154(b) by 143 days.

(21) Appl. No.: 15/967,196

(22) Filed: Apr. 30, 2018

(65) Prior Publication Data

US 2019/0331612 A1    Oct. 31, 2019

(51) Int. Cl.
| | |
|---|---|
| *G01N 21/01* | (2006.01) |
| *G01N 21/954* | (2006.01) |
| *G01M 3/00* | (2006.01) |
| *G01N 21/88* | (2006.01) |

(52) U.S. Cl.
CPC .......... *G01N 21/954* (2013.01); *G01M 3/005* (2013.01); *G01N 21/8803* (2013.01); *G01N 2021/9542* (2013.01)

(58) Field of Classification Search
CPC ........ G01M 3/00; G01M 3/005; G01N 21/01; G01N 21/954; G01N 21/8803; G01N 2021/9542
See application file for complete search history.

(56) References Cited

U.S. PATENT DOCUMENTS

| | | | |
|---|---|---|---|
| 5,096,292 A | 3/1992 | Sakamoto et al. | |
| 5,145,637 A | 9/1992 | Richardson et al. | |
| 5,164,826 A | 11/1992 | Dailey | |
| 5,594,548 A * | 1/1997 | Kobayashi | F27D 21/02 356/241.1 |
| 6,371,907 B1 | 4/2002 | Hasegawa et al. | |
| 9,476,823 B2 | 10/2016 | Ward et al. | |
| 9,651,503 B2 * | 5/2017 | Bueno | G01N 21/954 |
| 2003/0089183 A1 | 5/2003 | Jacobsen et al. | |
| 2003/0121340 A1 | 7/2003 | Hawkins et al. | |
| 2008/0265878 A1 | 10/2008 | Bousquet et al. | |
| 2017/0031492 A1 | 2/2017 | Coombs et al. | |

(Continued)

FOREIGN PATENT DOCUMENTS

JP        2003194783 A      7/2003

OTHER PUBLICATIONS

International Search Report and Written Opinion dated Sep. 11, 2019 for International Application No. PCT/US2019/028869 (12 pages).

(Continued)

*Primary Examiner* — Nguyen Q. Ha  
(74) *Attorney, Agent, or Firm* — Mintz Levin Cohn Ferris Glovsky and Popeo, P.C.

(57) ABSTRACT

A probe driver may have a coupling that interfaces with a conduit section at a first position of the conduit section. The probe driver also may have an input structure that actuates in response to a user input indicating a second position of the conduit section. The probe driver may also have one or more positioning elements to reposition the conduit section to interface with the coupling at the second position of the conduit section in response to the user input.

18 Claims, 4 Drawing Sheets

(56) References Cited

U.S. PATENT DOCUMENTS

2019/0064080 A1* 2/2019 Glover ................ G01N 21/954

OTHER PUBLICATIONS

Olympus; "Industrial remote visual inspection product guide;" last accessed Sep. 4, 2017, 23 pages.
SPI Borescopes Inspection & technology; "Oil & Gas Borescopes;" http://spiborescopes.com/industries/oilgas-borescopes/; last accessed Sep. 4, 2017; 9 pages.

* cited by examiner

TECHNIQUES FOR CONTROL OF NON-DESTRUCTIVE TESTING DEVICES VIA A PROBE DRIVER

BACKGROUND

Certain equipment and facilities, such as power generation equipment and facilities, oil and gas equipment and facilities, aircraft equipment and facilities, manufacturing equipment and facilities, and the like, include a plurality of interrelated systems, and processes. For example, power generation plants may include turbine systems and processes for operating and maintaining the turbine systems. Likewise, oil and gas operations may include carbonaceous fuel retrieval systems and processing equipment interconnected via pipelines. Similarly, aircraft systems may include airplanes and maintenance hangars useful in maintaining airworthiness and providing for maintenance support. During equipment operations, the equipment may degrade, encounter undesired conditions such as corrosion, wear and tear, and so on, potentially affecting overall equipment effectiveness. Certain inspection techniques, such as non-destructive inspection techniques or non-destructive testing (NDT) techniques, may be used to detect undesired equipment conditions. It may be beneficial to improve control of NDT devices.

BRIEF DESCRIPTION

Certain embodiments commensurate in scope with the originally claimed disclosure are summarized below. These embodiments are not intended to limit the scope of the claimed disclosure, but rather these embodiments are intended only to provide a brief summary of possible forms of the disclosure. Indeed, the full disclosure may encompass a variety of forms that may be similar to or different from the embodiments set forth below.

The techniques described herein provide for a variety of gestures, such as touch-based gestures, that may be used to control certain NDT devices.

In a first embodiment, a non-destructive testing (NDT) system may include a sensor that collects data related to a surrounding environment, a conduit section coupled to the sensor, and a screen configured to display the data from the sensor. The NDT system may also include a probe driver having an input structure and a positioning element to position the conduit section, where the input structure may actuate in response to a user input, and where upon actuation, the input structure may generate a signal indicative of a positioning of the conduit section. The NDT system may also include a processor that receives the signal indicative of a position of the conduit section, and controls one or more operations of the probe driver to operate the positioning element to orientate the conduit section in the position.

In a second embodiment, a probe driver may include a coupling to interface with a conduit section at a first position of the conduit section, and an input structure that actuates in response to a user input indicating a second position of the conduit section. The probe driver may also include one or more positioning elements to reposition the conduit section to interface with the coupling at the second position of the conduit section in response to the user input.

In a third embodiment, a method involves receiving, via a probe driver, an indication of a positioning instruction based on a user input, wherein the positioning instruction may corresponds to a direction to position a conduit section during an inspection. The method may also involve, in response to the positioning instruction, changing, via the probe driver, one or more operations of the probe driver, where the changing of the one or more operations of the probe driver positions the conduit section.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Embodiments of the subject matter disclosed herein generally relate to non-destructive testing (NDT) systems and devices, which may be used to inspect a variety of equipment and facilities (e.g., industrial equipment and facilities, power generation equipment and facilities, and aircraft equipment and facilities). The NDT systems and devices may be used to inspect equipment and facilities by collecting images and data of the equipment and facilities as well as inside the equipment and facilities. Accordingly, certain embodiments of the disclosed subject matter may relate to a probe driver for controlling a movement of an imaging device associated with the NDT systems and devices. In particular, some embodiments of the disclosed subject matter may utilize a probe driver to control, for example, a retraction and/or an insertion of an imaging device of an NDT device into an asset based on an operation of the probe driver. In certain embodiments, buttons, a joystick, and/or relative control gestures on a touchscreen associated with the NDT system or device, may be used to control a positioning of the imaging device in an asset (e.g., to move the imaging device from a first position to a second position). Other embodiments are within the scope of the disclosed subject matter.

One or more specific embodiments will be described below. In an effort to provide a concise description of these embodiments, all features of an actual implementation may not be described in the specification. In the development of any such actual implementation, as in any engineering or design project, numerous implementation-specific decisions may be made to achieve the developers' specific goals, such as compliance with system-related and business-related constraints, which may vary from one implementation to another. Moreover, such a development effort might be complex and time consuming, but may nevertheless be a routine undertaking of design, fabrication, and manufacture for those of ordinary skill having the benefit of this disclosure.

Non-destructive testing (NDT) devices and systems may be used to inspect various equipment and facilities, such as power generation equipment and facilities, oil and gas equipment and facilities, aircraft equipment and facilities, and manufacturing equipment and facilities, without destroying the systems and/or devices being inspected. NDT devices and systems sometimes include measurement devices (e.g., sensors) and cameras that may be inserted into various locations in or around the equipment and facilities. The measurement devices and cameras are remotely coupled to other devices that an operator may use to view the data gathered by the measurement device and camera as well as control the measurement device and camera.

As such, a probe driver may include a physical joystick, a virtual joystick, a control pad, or a combination thereof that cause the operator to control or otherwise position a sensor (e.g., measurement device and/or camera sensor) during an inspection. To improve upon the technique of positioning the sensor, the operator may use the probe drive to insert, remove, reposition, and so forth, the sensor to perform an inspection. Additionally, the accuracy of an inspection may improve as the operator's control of sensor positioning inside an asset improves. Thus, a probe driver that increases control of the position of the sensor may improve the accuracy of the inspection by facilitating an increase in ability of the operator to inspect the same location on different inspected assets—improving the inspection quality through improving inspection consistency.

In one embodiment, an operator may operate a probe driver in coordination with a menu driven inspection (MDI) of a video borescope. A MDI may provide instructions of varying detail to guide an operator through the inspection. The MDI may provide instructions to guide an operator in positioning a sensor. For example, the MDI may provide instructions indicating a length to insert a sensor into an asset, or a degree of rotation to orient a sensor in an asset. Using the MDI in coordination with a probe driver may improve consistency of inspection between operators, assets, inspections, and the like. Using the MDI in coordination with the probe driver may also provide for shorter training time of operators. The MDI guides the operators through the steps of the inspection causing operators with shorter training periods in the inspection to correctly perform the inspection.

An additional aspect of the probe driver is that an operator may operate the probe driver with one hand through a joystick, a control pad, buttons, and the like. Operating the probe driver with one hand improves upon positioning techniques because the operator may conceivably have a second hand unused and able to hold a handheld video borescope. Holding the handheld video borescope throughout the positioning of the sensor in the asset may increase the ability of an operator to place the sensor as desired because the operator is now able to receive feedback on the position of the sensor while positioning the sensor.

Figure 1:
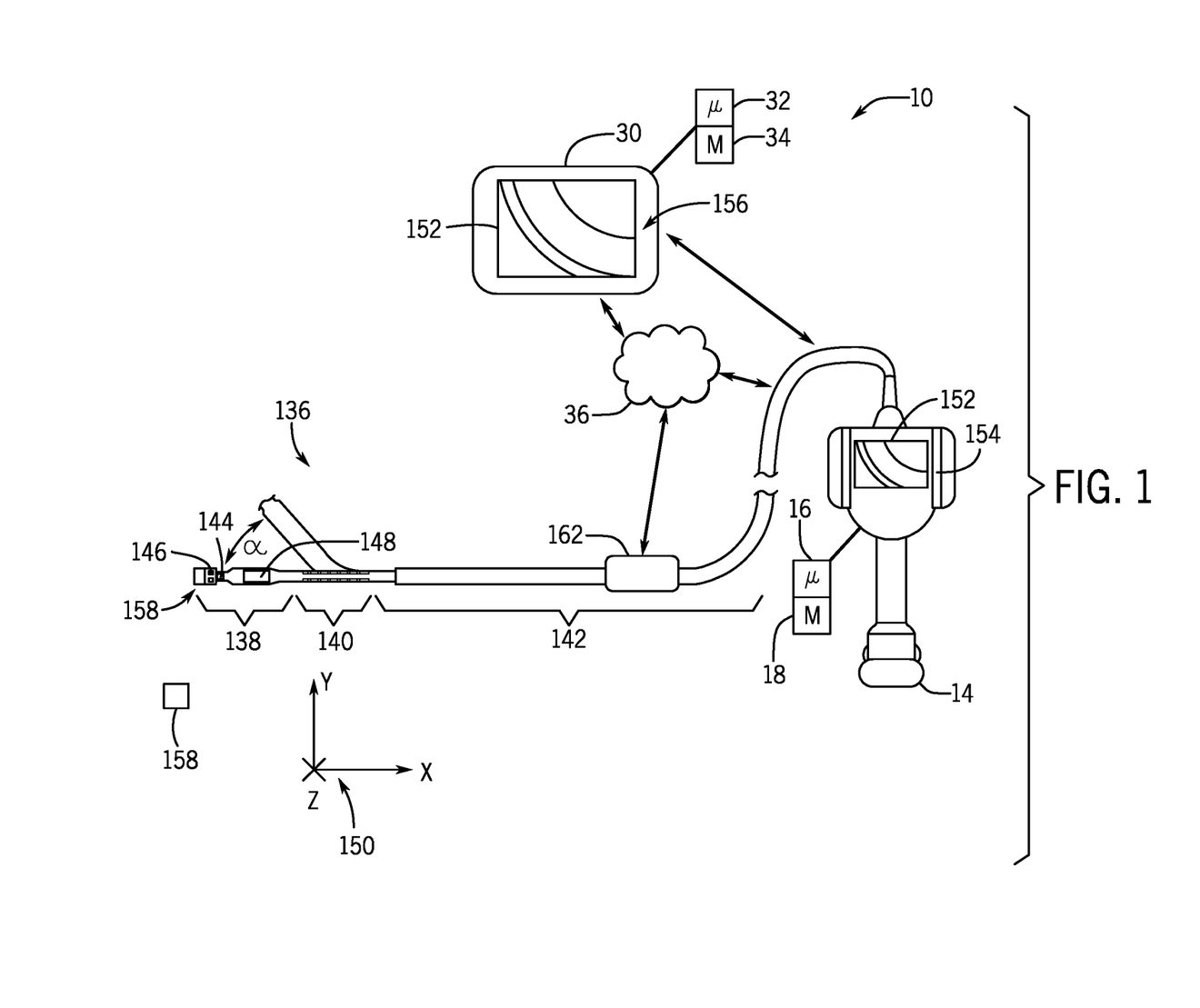
FIG. 1 is a front view of a borescope with a probe driver, in accordance with an embodiment.

With the foregoing in mind, FIG. 1 is a front view of an embodiment of a NDT device 10, a borescope 14. The borescope 14 may have one or more processors 16 and a memory 18, and may be used to inspect, for example, turbo machinery, containers, vessels, compressors, pumps, turbo expanders, wind turbines, hydroturbines, industrial equipment, residential equipment, and the like. As illustrated, the borescope 14 may be communicatively coupled to a mobile device 30 also having one or more processors 32 and a memory 34. The mobile device 30 may include, for example, a tablet, a cell phone (e.g., smart phone), a notebook, a laptop, or any other mobile computing device. Accordingly, in one embodiment, the mobile device 30 may be the tablet mentioned above available from General Electric Co., of Schenectady, N.Y., and providing for touch-screen input. The mobile device 30 may be communicatively coupled to the borescope 14 through a variety of wireless or wired conduits. For example, the wireless conduits may include WiFi (e.g., Institute of Electrical and Electronics Engineers [IEEE] 802.11X), cellular conduits (e.g., high speed packet access [HSPA], HSPA+, long term evolution [LTE], WiMax), near field communications (NFC), Bluetooth, personal area networks (PANs), and the like. The wireless conduits may use a variety of communication protocols, such as TCP/IP, UDP, SCTP, socket layers, and so on. In certain embodiments, the wireless or wired conduits may include secure layers, such as secure socket layers (SSL), virtual private network (VPN) layers, encrypted layers, challenge key authentication layers, token authentication layers, and so on. Wired conduits may include proprietary cabling, RJ45 cabling, co-axial cables, fiber optic cables, and so on.

Additionally or alternatively, the mobile device 30 may be communicatively coupled to the borescope 14 through a cloud 36. Indeed, the mobile device 30 may use the cloud 36 computing and communications techniques (e.g., cloud-computing network), including but not limited to HTTP, HTTPS, TCP/IP, service oriented architecture (SOA) protocols (e.g., simple object access protocol [SOAP], web services description languages (WSDLs)) to interface with the NDT inspection devices from any geographic location, including geographic locations remote from the physical location about to undergo inspection. Further, in some embodiments, the mobile device 30 may provide "hot spot" functionality in which mobile device 30 may provide wireless access point (WAP) functionality suitable for connecting the borescope 14 to other systems in the cloud 36.

The borescope 14 may be controlled by a variety of operators located at the inspection site and/or a remote location. For example, a borescope operator may physically manipulate the borescope 14 at one location, while a mobile device operator may use the mobile device 30 to interface with and physically manipulate the borescope 14 at a second location through remote control techniques. The second location may be proximate to the first location or geographically distant from the first location. Additionally, the operators may communicate with each other by using the mobile device 30, the borescope 14, and/or devices communicatively coupled via the cloud 36 through techniques such as voice over IP (VOIP), virtual whiteboarding, text messages, and the like.

In the present embodiments, the operator may control a position of a sensor of the borescope 14 using relative control gestures (e.g., touch gestures). The relative control gestures may be used on their own or may be combined with inputs derived from other control devices (e.g., physical manipulation device such as a physical joystick, one or more buttons, a physical control pad, and so on) to position a sensor. Additionally, the relative control gestures may be combined with control inputs from other external systems, such as a second NDT system, a laptop, cell phone, tablet, and so on. The operator may control a position of a sensor of the borescope 14 during an inspection through inputs on the borescope 14. These inputs may control the position of the sensor to a particular degree. That is, the operator may manually insert, remove, twist, and so forth, a tubing of the sensor to additionally position the sensor of the borescope beyond the capabilities of the inputs on the borescope 14. For example, a feature of interest on the asset may be out of an observable range of the sensor so an operator may manually position, or orientate, the borescope 14 to bring the sensor into the observable range of the feature.

With the foregoing in mind, during an inspection, the borescope 14 may provide data to any number of devices connected to the cloud 36 or inside the cloud 36. As mentioned above, the mobile device 30 may be used to receive data from the borescope 14, to remotely control the borescope 14, or a combination thereof. For example, a variety of data may be transmitted from the borescope 14 to the mobile device 30, including but not limited to images, video, and sensor measurements, such as temperature, pressure, flow, clearance (e.g., measurement between a stationary component and a rotary component), and distance measurements. Likewise, the mobile device 30 may communicate control instructions (e.g., relative control gestures), reprogramming instructions, configuration instructions, and the like to the borescope 14.

As depicted, the borescope 14 includes an insertion tube 136 suitable for insertion into a variety of locations, such as inside turbomachinery, equipment, pipes, conduits, underwater locations, curves, bends, inside or outside of an aircraft system, and the like. The insertion tube 136 may include a head end section 138, an articulating section 140, and a conduit section 142. In the depicted embodiment, the head end section 138 may include a camera 144, one or more lights 146 (e.g., LEDs), and one or more sensors 148. In general, the head end section 138 may include one or more sensors that collect data about the surrounding environment (e.g., a camera 144, a sensor 148, etc.) As mentioned above, the camera 144 of the borescope 14 may provide images and video suitable for inspection. The lights 146 may be used to provide for illumination when the head end section 138 is disposed in locations having low light or no light.

During use, the articulating section 140 may be controlled, for example, by the mobile device 30 and/or control inputs (e.g., relative control gestures) from the borescope 14. In particular, a set of relative control gestures may be used to control the articulating section 140. The articulating sections 140 may steer or "bend" in various dimensions, and may use pneumatic steering (i.e., one or more pneumatic cylinders), mechanical motors and wires, or a combination thereof to adjust the orientation of the head end section 138. For example, the articulation section 140 may enable movement of the head end section 138 in an X-Y plane, X-Z plane, and/or Y-Z plane of the depicted XYZ axis 150. Indeed, the relative control gestures may be used to perform control actions suitable for disposing the head end section 138 at a variety of angles, such as the depicted angle α. In this manner, the head end section 138 may be positioned to visually inspect desired locations. The camera 144 may then capture, for example, a video 152 and/or still images, which may be displayed in a screen 154 of the borescope 14 and a screen 156 of the mobile device 30, and may be recorded by the borescope 14 and/or the mobile device 30. In the depicted embodiments, the screens 154 and 156 may be multi-touch touch screens using capacitance techniques, resistive techniques, infrared grid techniques, and the like, to detect the touch of a stylus and/or one or more human fingers. Additionally or alternatively, images and the video 152 may be transmitted into the cloud 36.

Other data, including but not limited to sensor 148 data, may additionally be communicated and/or recorded by the borescope 14. The sensor 148 data may include temperature data, distance data, clearance data (e.g., distance between a rotating and a stationary component), flow data, and so on. In certain embodiments, the borescope 14 may include a plurality of replacement tips 158. For example, the replacement tips 158 may include retrieval tips such as snares, magnetic tips, gripper tips, and the like. The replacement tips 158 may additionally include cleaning and obstruction removal tools, such as wire brushes, wire cutters, and the like. The replacement tips 158 may additionally include tips having differing optical characteristics, such as focal length, stereoscopic views, 3-dimensional (3D) phase views, shadow views, and so on. Additionally or alternatively, the head end section 138 may include a removable and replaceable head end section 138. Accordingly, a plurality of head end sections 138 may be provided at a variety of diameters, and the insertion tube 136 maybe disposed in a number of locations having openings from approximately one millimeter to ten millimeters or more. Indeed, a wide variety of equipment and facilities may be inspected, and the data may be shared through the mobile device 30 and/or the cloud 36.

During use of the borescope 14, an operator may insert, retract, and/or otherwise position the conduit section 142 in an asset (e.g., equipment or facilities to be inspected). In some embodiments, coupling a probe driver 162 to the conduit section 142 may improve accuracy of an inspection of the asset through increasing control of the positioning of the conduit section 142 in the asset. Furthermore, the accuracy of an inspection may improve from using instructions (e.g., written instructions, instructions provided via a MDI) provided to an operator in conjunction with the probe driver 162. For example, an operator may be instructed by an MDI to insert the conduit section 142 ten feet into an asset and, by using the probe driver 162, the operator may insert the conduit section 142 into the asset and receive feedback from the probe driver 162 when the conduit section 142 is ten feet in the asset.

Once an operator has the conduit section 142, the articulating section 140, and the head end section 138 positioned as instructed by the MDI and/or positioned as desired, the operator may operate the borescope 14 and/or mobile device 30 to acquire an image or video of the asset. To do so, the operator may actuate a button and/or a user input element on the borescope 14 and/or mobile device 30. In response to the actuation, the button and/or the user input element may generate a signal indicative of a request for acquisition of an image or video. The borescope 14 and/or mobile device 30 may receive the signal indicative of the request for acquisition of the image or video and may transmit a control signal to operate the camera 144. Once the camera 144 acquires the image or video, the borescope 14 and/or mobile device 30 may receive data corresponding to the acquired image or video and may store the data in the memory 18 or 34, may process the image via the processor 16 or 32, the processor 16 or 32 may receive the data and display the data as an image or video via the screen 154 or 156, and/or the like. Furthermore, the acquired image or video may be saved in a report detailing results of the MDI.

The borescope 14 and/or the mobile device 30 may include a "generate report" button, to generate the report stated above. When activated, the "generate report" button may generate a shell document for a report that includes the information collected through the MDI and all of the images and any accompanying data that an operator may enter into the borescope 14 and/or mobile device 30 throughout an MDI of an asset (e.g., written notes, verbal observations or annotations, flagging images for the purposes of doing additional investigation into a health of a portion of the asset). In some embodiments, the shell document also includes a link (e.g., hyperlink) to a repository that includes the videos and any accompanying data. Alternately or additionally, the shell document may include the image and/or videos and any accompanying data gathered during the MDI. Similarly, the shell document may include the recorded voice annotations or a link to a repository containing the recorded voice annotations. When the operator is satisfied with the shell document for the report, the operator may save the shell document as the report for the MDI in a desired memory location (e.g., the memory 34, the memory 18, cloud-connected devices not illustrated in FIG. 1, and/or the cloud 36). It is noted that the operator may alter the shell document into however detailed or summarized of reports the operator desires. Based upon the report generated, an operator may transmit the report for decision-making purposes, for example, to adjust or replace various components of the assets inspected. The report, as a summary of the inspection, may be used to compare conclusions that arose from the inspection to other reports of other inspections. Thus, these reports may be useful in comparing inspection conclusions between iterations of inspections, and in making maintenance and/or business decisions.

In this way, having a probe driver 162 coupled to a borescope 14 may improve inspections and improve inspection repeatability between instances of the MDI. Furthermore, improving inspection repeatability also may improve an analysis of inspection reports. When an operator executing the inspection has improved control of positioning the borescope 14 during an inspection, the inspection reports detailing findings of the inspections may also improve since there may be an improved consistency of images, videos, and/or accompanying data of the inspection included in the inspection report that facilitates accurate review of inspection reports (e.g., reviewing two images of two different assets may be easier when the images are of the exact same position showing the same view of the asset than two images of different views of the asset for purposes of equipment inspection).

Figure 2:
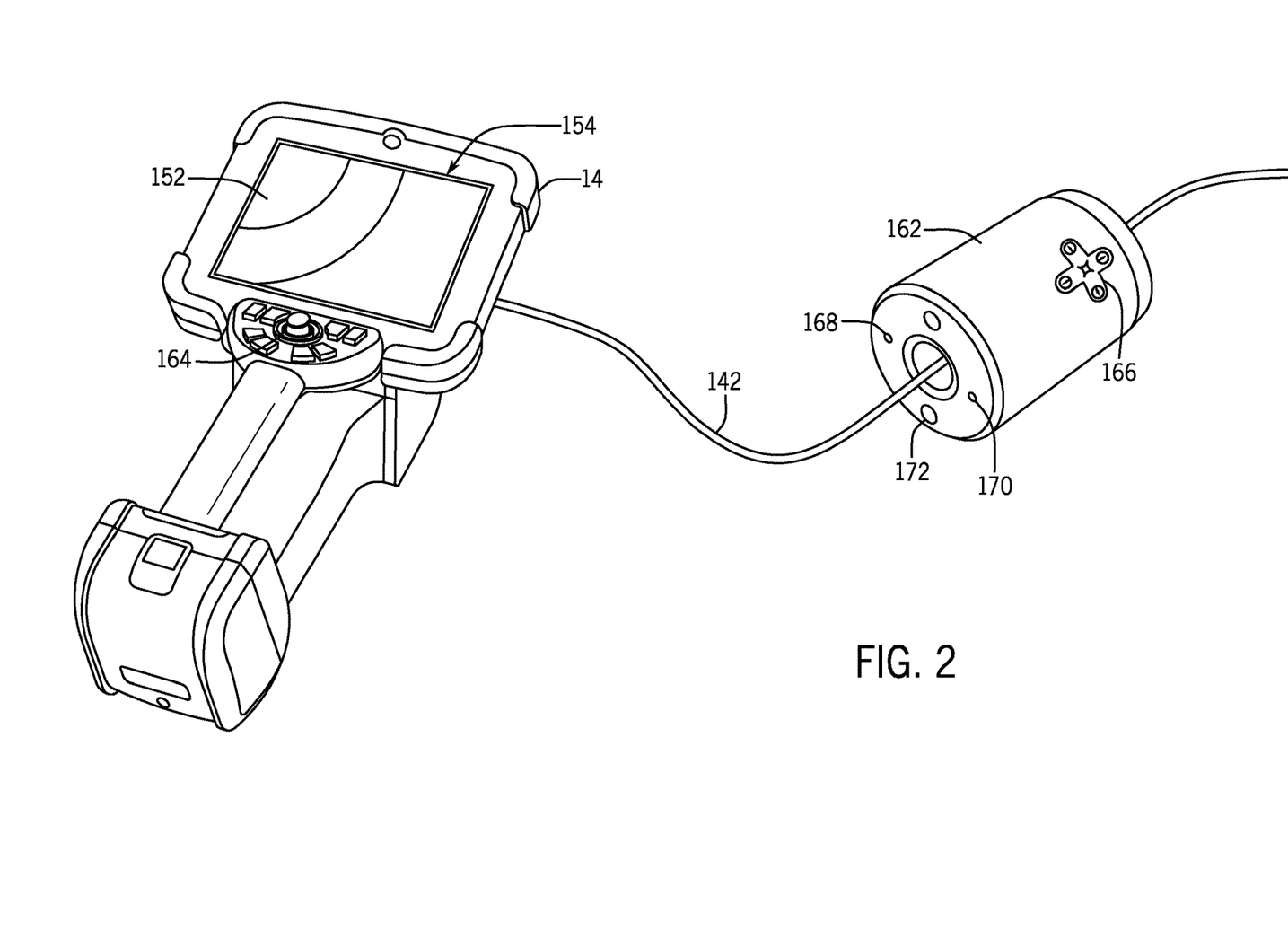
FIG. 2 is a perspective view of the borescope of FIG. 1 and the probe driver of FIG. 1, in accordance with an embodiment.

To help elaborate upon the probe driver 162, FIG. 2 is a perspective view of an embodiment of the borescope 14 communicatively coupled to the mobile device 30 and to the cloud 36. As described earlier, the borescope 14 may include the screen 154, the video 152, and may couple to the conduit section 142, the head end section 138, and the articulating section 140 of the borescope 14. The borescope 14 may have user inputs 164 for controlling a position of the head end section 138 and/or the articulating section 140. The conduit section 142 may couple to the probe driver 162. An operator may use the probe driver 162 to cause a position of the conduit section 142 to change. The probe driver 162 may include one or more motors, one or more power sources (e.g., lithium ion batteries, rechargeable batteries, a direct current power wired power connection), and one or more driven wheels that all may operate to power, position, and/or drive the conduit section 142 through the probe driver 162, as is elaborated upon in discussions associated with FIG. 3 and FIG. 4. The probe driver 162 may change a position of the conduit section 142 through these positioning elements in response to positioning instructions received via user inputs 166. It is noted that, although depicted as included on the probe driver 162, the user inputs 166 used to control the probe driver 162 may be included on the borescope 14 and/or the mobile device 30 similar to the user inputs 164.

The probe driver 162 may receive positioning instructions to retract or extend the conduit section 142 via actuation of the user inputs 166. The user inputs 166 may be a variety of input structures including a joystick, a digital pad, a control pad, a 3D spatial mouse (e.g., a computer mouse that facilitates navigation and selection within a 3D plane instead of the 2D plane of a display) and/or one or more buttons. Additionally or alternatively, the probe driver 162 may operate in response to positioning instructions received verbally (e.g., verbal commands from an operator). In these embodiments, the borescope 14, the mobile device 30 may receive verbal positioning instructions (e.g., spoken from the operator) and may transmit control signals (e.g., wireless control signals, control signals transmitted via a physical communicative coupling) to operate the probe driver 162 in response to verbal positioning instructions, or the probe driver 162 may receive the verbal positioning instructions from the operator and may operate to extend or retract the conduit section 142 in response to the verbal positioning instructions. In some embodiments, the user inputs 166 may control a rotation of the conduit section 142 (e.g., to move or position the conduit section 142 in a rotational direction, rotate the conduit section 142, rotate the conduit section 142 about a circumference associated with an axis from a first position to a second position), in addition to the retraction (e.g., to move or position the conduit section in a retraction direction) and the extension (e.g., to move the conduit section in an extension direction) of the conduit section 142, as will be described later. It is noted that the specific user input 166 implemented to control the probe driver 162 may be based on the final application of the probe driver 162 (e.g., a particular asset may inspected using a 3D spatial mouse if the asset resembles a 3D plane during the inspection).

In some embodiments, an operator, through a control pad on the probe driver 162, the borescope 14, and/or mobile device 30, may use tactile inputs as positioning instructions. For example, a two-finger touch to insert the conduit section 142 into the asset by "zooming in" on the control pad (e.g., an operator uses two fingers in contact with the control pad, where the two fingers to "zoom in" start at a same starting point and are dragged in opposite directions outwards from the starting point). Furthermore, the operator may remove the conduit section 142 from the asset by "zooming out" on the control pad (e.g., two fingers start apart on the control pad and are pulled closer to a same ending point), and/or the operator may rotate the conduit section 142 by "touch and rotating" on the control pad (e.g., the operator's two fingers make contact with the control pad and rotate left or right while maintaining contact with the control pad, mimicking a rotation of the conduit section 142 which is translated into an actual rotation of the conduit section 142). In this way, a variety of touch gestures may be programmed to correspond to a variety of borescope 14 functions and/or probe driver 162 functions. It is noted that although specific motions are detailed in this disclosure, any valid tactile input and/or finger motion on a control pad may be used to communicate a positioning instruction to the probe driver 162.

The probe driver 162 may communicatively couple to the borescope 14 through the cloud 36, as described earlier. While the probe driver 162 may communicatively couple to a variety of devices through the cloud 36, however for ease of discussion, the borescope 14 to probe driver 162 relationship will be elaborated upon.

If the probe driver 162 communicatively couples to the borescope 14 and/or additional devices connected through the cloud 36, an indicator 168 may be operated to indicate an active, or successful, coupling. The processor 16 may facilitate in operating the indicator 168 if the communicative coupling through the cloud 36 is successful. Additionally or alternatively, the probe driver 162 may communicatively couple to the borescope 14 via a Bluetooth connection, where the indicator 168 may operate to indicate a successful Bluetooth connection between the elements. The borescope 14 may receive images, video, and/or other sensor readings (e.g., measurements, sensed parameters) from the probe driver 162 through the communicative coupling. The communicative coupling between the probe driver 162 and the borescope 14 may also facilitate a transmission of feedback from the probe driver 162 to the borescope 14. Additionally, the probe driver 162 may include an indicator 170 that indicates a power state of the probe driver 162. As such, the indicator 170 may have a first operation if the probe driver 162 is powered-on, a second operation if the probe driver 162 is charging and/or is coupled to a charging power source, a third operation if the probe driver 162 is low-power (e.g., to indicate to replace a battery, to indicate to charge), and so on. In some embodiments, the probe driver 162 may include a power input 172 to facilitate in charging a rechargeable battery, and/or to facilitate in inputting an external electrical connection to power the probe driver 162.

In some embodiments, the probe driver 162 may physically couple to the borescope 14 through a pronged communicative coupling connection. The pronged communicative coupling connection may act to support the probe driver 162 to the borescope 14 during operation. There may be some embodiments where additional physical support is desired to improve a physical coupling between the probe driver 162 and the borescope 14. A pronged communicative coupling connection may look similar to an electrical connection to an electrical outlet, where the probe driver 162 may be plugged into the borescope 14 in a manner the same as plugging an electrical connection into an electrical outlet—however, the pronged communicative coupling connection may cause electrical power and/or data signals to transmit between the borescope 14 and the probe driver 162 (e.g., contrasting how an electrical connection to an electrical outlet causes electrical power to transmit through the connection). Additionally or alternatively, in some embodiments, the probe driver 162 may physically couple to the conduit section 142 of the borescope 14 through a variety of methods including a clamshell coupling (e.g., hinged on a first side and able to open about the hinge), a pull through coupling (e.g., where a portion of the conduit section 142, the head end section 138, and the articulating section 140 may be pulled through the probe driver 162 to prepare for operation of the probe driver 162), and the like.

During operation, the probe driver 162 may position the conduit section 142 of the borescope 14. The probe driver 162 may provide feedback (e.g., to borescope 14 via communicative coupling, through feedback mechanisms included in the probe driver 162) such that the feedback may assist the operator in the operation of the probe driver 162. The feedback may be provided in response to a relative position of the conduit section 142, a position of the head end section 138, and the like. Additionally or alternatively, feedback may be provided in response to strain exerted on the conduit section 142. While the probe driver 162 operates to extend or retract the conduit section 142, an obstruction, obstacle, and/or blockage may cause the positioning (e.g., the extension, the retraction) to be impeded. The probe driver 162 may transmit a vibrational, audible, and/or visual indication in response to the positioning being impeded.

The processor 16 of the borescope 14, the processor 32 of the mobile device 30, or the like, may receive a current measurement at defined time intervals (e.g., programmed into the borescope 14 that the processor samples at the defined time intervals) during operation of the probe driver 162 from sensors of the probe driver 162, as will be described herein. Upon receiving the current measurements, the processor 16 or 32 may compare the current measurement to defined thresholds of desired current measurements. In response to the current measurement being outside of the defined thresholds, the processor 16 or 32 may operate feedback elements of the probe driver 162 to deliver feedback to the operator. For example, the processor 16 or 32 may transmit control signals via communication channels to the probe driver 162 such that a vibrational motor of the probe driver 162 alerts the operator that the positioning is impeded. In this way, haptic feedback via vibration motors, audio feedback via audio outputs, and/or visual feedback via visual indicators (e.g., a display, a screen, visual feedback on the screen 154, a light indicator, indicator similar to indicator 170 or 168) may be provided to the operator from the probe driver 162, borescope 14, and/or mobile device 30 based on the current measurement. It is noted that while many functions of the processor 16 may be performed by the processor 32, or by appropriate processors coupled through the cloud 36, for ease of discussion going forward the relationship of the processor 16 with the probe driver 162 will be focused on in the disclosure.

Figure 3:
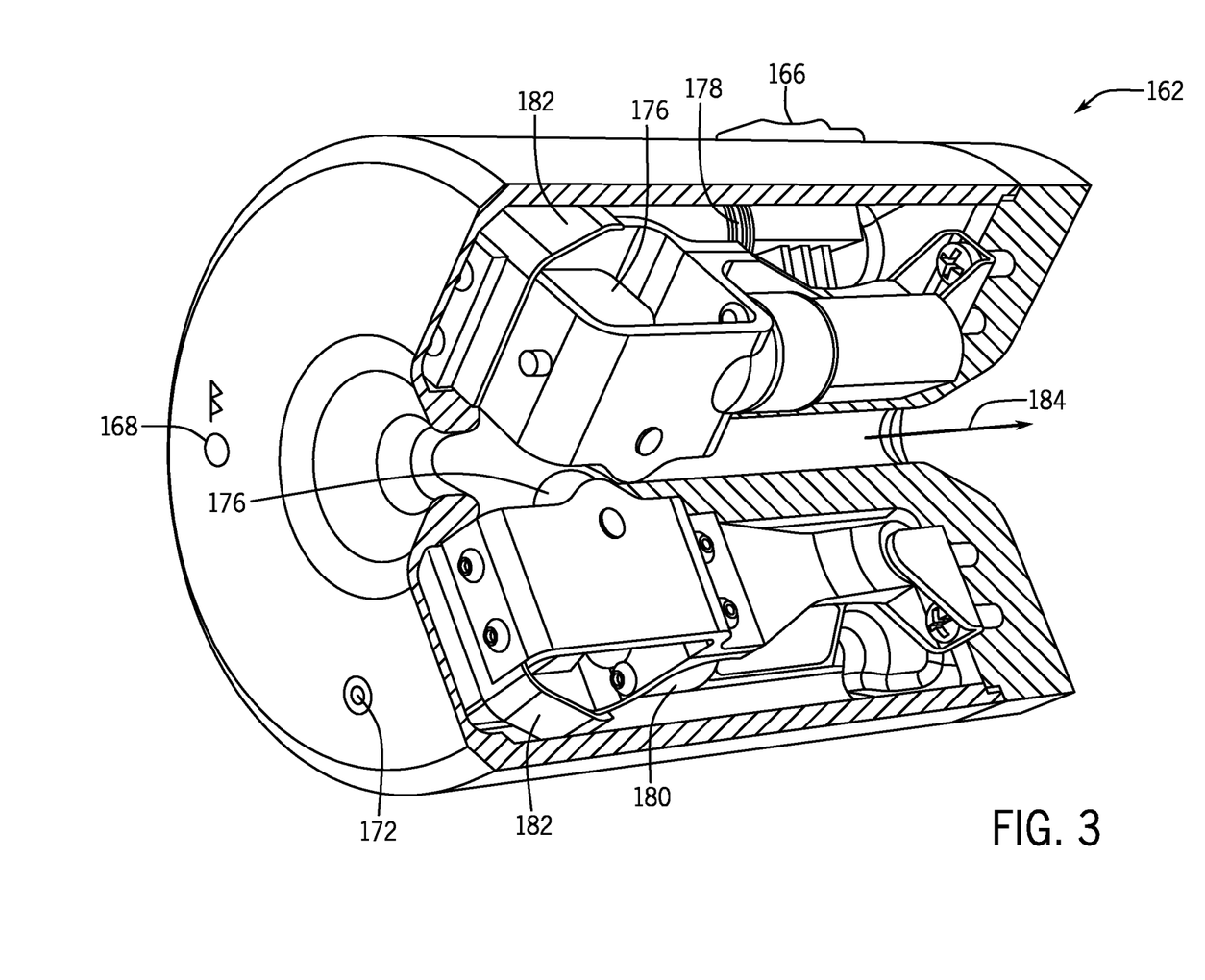
FIG. 3 is a cross-sectional view of an embodiment of the probe driver of FIG. 1, in accordance with an embodiment.

FIG. 3 is a cross-sectional view of the probe driver 162 and shows mechanisms of the probe driver 162 to position the conduit section 142. The probe driver 162 positions the conduit section 142 in response to one or more positioning instructions received through the user inputs 166. Upon the probe driver 162 receiving a positioning instruction, the probe driver 162 may operate driven wheels 176 to extend and/or retract the conduit section 142 into or out of the asset. A driver motor 178 operates the driven wheels 176 (e.g., the motor drives the wheels to rotate, or spin). A battery 180 and/or another power source electrically coupled to the driver motor 178 causes the driver motor 178 to operate the driven wheels 176. To control a position of the conduit section 142, thus executing a positioning instruction from the operator, the probe driver 162 may operate the driver motor 178 forward and/or reverse to control the direction the driven wheels 176 rotate (e.g., counter-clockwise, clockwise).

In some embodiments, the probe driver 162 may position a variety of conduit diameters of the borescope 14. The application flexibility of the probe driver 162 may be possible through spring-loaded surfaces 182 to cause the driven wheels 176 to contact a variety of conduit sections 142 diameters. The spring-loaded surfaces 182 use spring forces to cause the driven wheels 176 to press against the conduit sections 142 causing the probe driver 162 to accommodate and/or fit a range of diameters of conduit sections 142. For example, a probe driver 162 with spring-loaded surfaces 182 may fit about 3.9 mm through about 8.4 mm diameters of conduit sections 142.

The probe driver 162 may have different operational modes. The probe driver 162 may have a fully-manual operational mode. In the fully-manual operational mode, the probe driver 162 may receive a positioning instruction via user inputs 166. The probe driver 162 may have a semi-automatic operational mode. In the semi-automatic operational mode, the probe driver 162 may receive positioning instruction via user inputs 166 in addition to the MDI. For example, as a part of a MDI, the operator may be guided via the MDI to perform a first step and the probe driver 162 may be instructed via the MDI to execute a positioning instruction to perform a second step. For a second example, a MDI may instruct (e.g., through visual indications on the screen 154) an operator to take a picture of the outside of a vessel and secure the probe driver 162 to the outside of the vessel. When the operator completes the instructions of the MDI, the MDI may proceed to instruct the probe driver 162 (e.g., via control signals) to insert the conduit section 142 a certain distance into the vessel (e.g., three feet into the vessel), and upon execution of those instructions by the probe driver 162, the MDI may provide a second set of instructions to the operator to follow.

In addition to the fully-manual operational mode and the semi-automatic operational mode, the probe driver 162 may have a disengaged operational mode. During an inspection, the conduit section 142 may have to be removed from an asset faster than the probe driver 162 may be able to, or the operator may determine to drive, or position, the conduit section 142 without the probe driver 162 (e.g., override the probe driver 162 fully-manual operational mode). For these instances, the probe driver 162 may enter the disengaged operational mode where the spring-loaded surfaces 182 may retract, or disengage, and the conduit section 142 may be removed from or inserted into the asset by physical motions of the operator. Additionally, the disengaged operational mode may be used by an operator to insert or remove the conduit section 142 from the probe driver 162.

To insert and/or remove the conduit section 142 from the probe driver 162, the spring-loaded surfaces 182 may be put into the disengaged operational mode. Once disengaged, the spring-loaded surfaces 182 and the driven wheels 176 may cause the conduit section 142 to be removed or inserted freely (e.g., without the spring-loaded surfaces 182 impeding movement) by an operator along axis 184. It is noted that the conduit section 142 is inserted into the probe driver 162 and/or into the asset following the direction of the axis 184 and removed from the probe driver 162 and/or from the asset opposing the direction of axis 184.

In some embodiments, a different mode may exist to cause the conduit section 142 to be clamped by the probe driver 162, where instead of the conduit section 142 being inserted or removed from the probe driver 162, the probe driver 162 is clamped around the circumference of the conduit section 142, where an operator may not place the probe driver 162 in the disengaged operational mode prior to clamping. Additional embodiments not described may be applied for coupling, joining, and/or associating the conduit section 142 with the probe driver 162 as long as the conduit section 142 is able to be removed and/or inserted into an asset by the probe driver 162 after the coupling.

Figure 4:
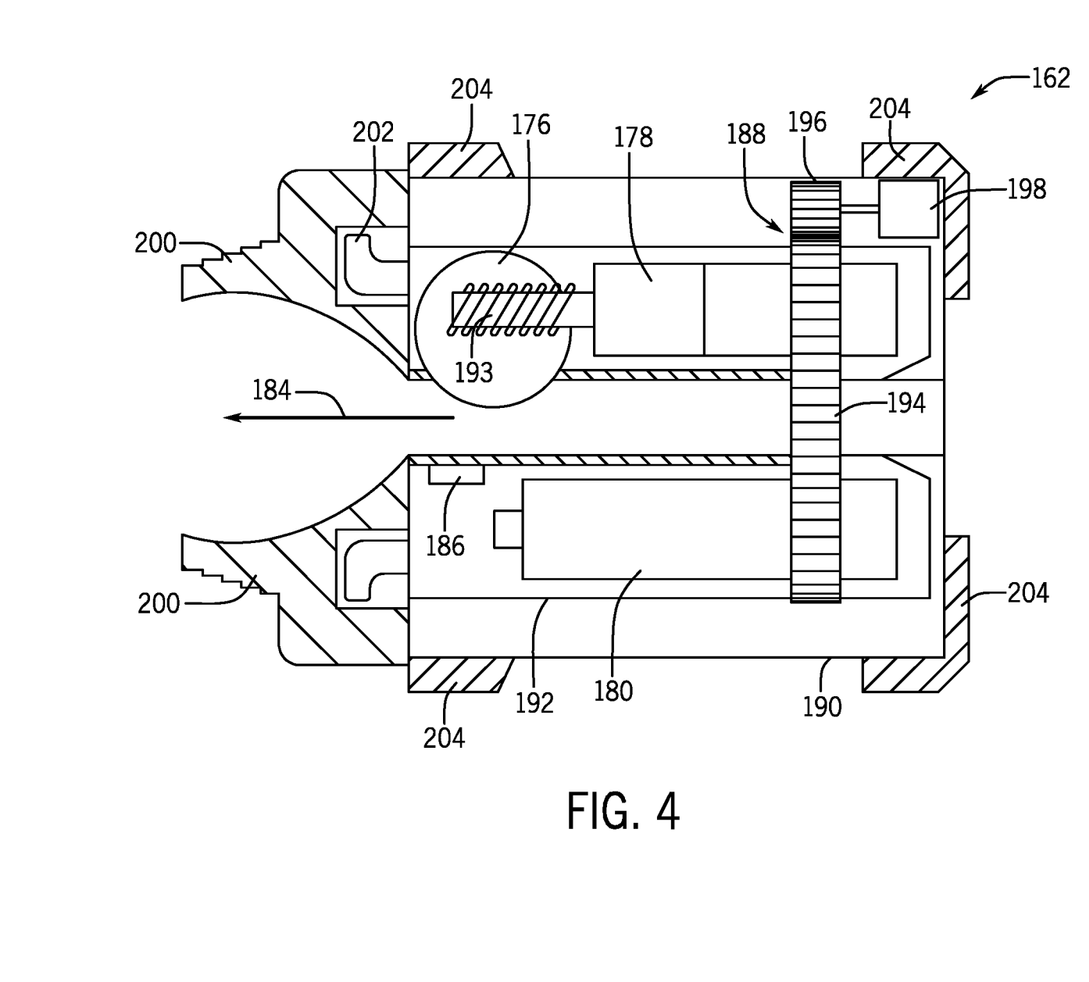
FIG. 4 is a cross-sectional view of a second embodiment of the probe driver of FIG. 1, in accordance with an embodiment.

Throughout the positioning of the conduit section 142 and/or the various operational modes of the probe driver 162, the probe driver 162 may transmit indications of measurements and/or may transmit measurements to the processor 16 of borescope 14 of how far extended the probe driver 162 has extended the conduit section 142 of the borescope 14. In some embodiments, an optical sensor measures a length extended of the conduit section 142 (e.g., sense an amount of the conduit section 142 passing through the probe driver 162). FIG. 4 illustrates the probe driver 162 with the optical sensor that may be used to measure the length extended of the conduit section 142.

FIG. 4 is a cross-sectional view of an embodiment of the probe driver 162. The probe driver 162 may include an optical sensor 186, the driven wheel 176, the driver motor 178, a battery 180, and a rotation mechanism 188 inside an outer housing 190. As described earlier, the optical sensor 186 may be used to measure a length extended of the conduit section 142. Measurements (e.g., sensed parameters) may transmit from the optical sensor 186 to the borescope 14 via the probe driver 162 through the communicative coupling. The processor 16 of the borescope 14 may receive measurements from the probe driver 162 and display the measurements on the screen 154. In some embodiments, the processor 16 of the borescope 14 may perform calculations and/or may otherwise process the measurements from the optical sensor 186 into a desired measurement. Additionally or alternatively, the processor 16 may store the measurements and/or desired measurements into memory 18. Although not illustrated, the probe driver 162 may include additional sensors, like current, voltage, and/or temperature sensors to provide sufficient measurements to the operator to operate the probe driver 162.

As illustrated, the battery 180 powers the driver motor 178 to drive the driven wheel 176 inside an inner housing 192. The driver motor 178 may rotate the driven wheel 176 through a coupling created with a worm gear 193 such that a position of rotation of the driven wheel 176 may be locked in place, or secured, after the rotation is completed.

In some embodiments, the probe driver 162 may have one or more additional of the batteries 180, driver motors 178, and driven wheels 176 to provide additional control of a position of the conduit section 142. In one embodiment, the probe driver 162 may have three batteries 180, three driver motors 178, and three driven wheels 176 distributed equidistance around the inner housing 192 of the probe driver 162. Regardless of the number of batteries 180, driver motors 178, and driven wheels 176, in some embodiments, the probe driver 162 may include the rotation mechanism 188.

The rotation mechanism 188 may couple between the outer housing 190 and the inner housing 192. The rotation mechanism 188 may include a ribbed surface 194, a turning gear 196, and a driver motor 198. The driver motor 198 may operate to rotate the turning gear 196 either counter clockwise or clockwise to drive the ribbed surface 194 to rotate either clockwise or counter clockwise. The ribbed surface 194 couples to the inner housing which is rotated through the rotation of the ribbed surface 194. Thus, the driver motor 198 may operate to rotate the inner housing 192 through causing the rotation of the ribbed surface 194. The rotation of the inner housing 192 causes a rotation of the conduit section 142 providing additional control of the borescope 14 during an inspection (e.g., where the rotation of the conduit section 142 causes the conduit section 142 to rotate about a circumference associated with the axis 184 from a first position to a second position, or from a reference position to a goal position). The probe driver 162 may operate the rotation mechanism 188 a particular way in response to control signals from the processor 16, where the control signals may be transmitted in response to positioning instructions. For example, the processor 16 may enable the rotation mechanism 188 through a control signal to enable a motor of the rotation mechanism 188 in response to receiving a positioning instruction via user inputs 166 to rotate. Thus, in response to the control signals from the processor 16, the probe driver 162 may operate the driver motor 198 (e.g., an operator instructing the probe driver 162 via user inputs 166 to rotate the conduit section 142), subsequently changing one or more operations of the probe driver 162 (e.g., the driver motor 198 was powered-off and, after the control signals, the driver motor 198 is power-on).

In addition, the rotation mechanism 188 of the probe driver 162 may include an additional optical sensor, similar to the optical sensor 186, and/or one or more additional sensors responsible for measuring the rotational position of the inner housing 192 in comparison to a starting position (e.g., a reference point, a reference position). Further, the probe driver 162 controls may be designed to not cause a complete rotation of the inner housing 192 (e.g., a rotation from the starting position back to the starting position for a 360° rotation) if the complete rotation of the inner housing causes twisting and/or knotting in the conduit section 142, or related portion of the borescope 14. It is also noted that in some embodiments, the causing or not causing of a complete rotation may be a setting specified via user inputs 164 and stored in memory 18.

While the turning gear 196 is depicted as similar to a helical gear design and/or a spur gear design (e.g., the difference between a helical gear design and a spur gear design being the angle of the teeth of the gear where the spur gear teeth are set at a 0° angle while the helical gear are not set at a 0° angle), the turning gear 196 and the ribbed surface 194 may be a rack and pinion gear design and/or may be a worm gear design, similar to the worm gear 193. It is noted that the specific design of turning gear 196 and the ribbed surface 194 is dependent upon the usage and environment of the probe driver 162 (e.g., there may be certain conditions where it is advantageous to have a worn gear design). In some embodiments, the driver motor 198 may implement a worm gear, similar to worm gear 193, to lock a position of rotation.

The outer housing 190 of the probe driver 162 may couple to bumpers 204 and attachment threading 200. Both the attachment threading 200 and the bumpers 204 are examples of variations of the probe driver 162 to make the probe driver 162 suitable for a variety of applications and inspections. The bumpers 204 may act to protect the probe driver 162 against usage (e.g., dropping, harsh chemical environments) while the attachment threading 200 may cause the probe driver 162 to be secured to an asset during an inspection. In these applications, the probe driver 162 may secure to the asset via the attachment threading 200. Connections 202 may cause attachments of additional attachment threading different from the attachment threading 200 to couple to the outer housing 190 once the attachment threading 200 is removed from the outer housing 190 via disconnection from the connections 202.

An embodiment of attachment threading 200 may use a Stewart-Gough Platform to orient the insertion of the conduit section 142 by orientating a position of the probe driver 162 relative to a surface of the asset (e.g., a wall of a vessel). The Stewart-Gough Platform may use actuators (e.g., hydraulic jacks, electric actuators) attached in pairs to three points around a platform approximately equidistant from each other, crossing over to an adjacent of the three points on an additional platform. The actuators may cause the probe driver 162 and the conduit section 142 to be orientated along six degrees of freedom by changing the orientation of the probe driver 162 to the surface of the asset. The ability to orientate the probe driver 162 and the conduit section 142 along additional axis and/or angles further improves control of the inspection, thus improving the inspection and inspection repeatability. Similar to the positioning instructions used in controlling an operation of the probe driver 162 to change the position of the conduit section 142, the user inputs 166 and/or 164 may be used in communicating positioning instructions to position the probe driver 162 along the additional axis and/or angles. For example, in some assets, an inspection point may be accessed when the probe driver 162 and the conduit section 142 are orientated at a specific angle via the Stewart-Gough Platform embodiment of the attachment threading 200.

Technical effects of the disclosure may include controlling a non-destructive testing (NDT) device used to inspect equipment and facilities. In particular, the disclosed embodiments includes using a probe driver to control a conduit section of a particular NDT device to extend control of the NDT device beyond an articulating section and a head-end section during an inspection. The probe driver may be assigned various control actions for controlling an orientation and/or movement of a conduit section of a NDT device and in this way controls orientations and/or movement of the NDT device. An operator may use the probe driver to insert or remove the conduit section of the NDT device to measured distances through optical sensors of the probe driver. It should be noted that the embodiments described in the specification may have other technical effects and can solve other technical problems.

To the extent that the claims recite the phrase "at least one of" in reference to a plurality of elements, this is intended to mean at least one or more of the listed elements, and is not limited to at least one of each element. For example, "at least one of an element A, element B, and element C," is intended to indicate element A alone, or element B alone, or element C alone, or any combination thereof. "At least one of element A, element B, and element C" is not intended to be limited to at least one of an element A, at least one of an element B, and at least one of an element C.

When introducing elements of various embodiments, the articles "a," "an," "the," and "said" are intended to mean that there are one or more of the elements. The terms "comprising," "including," and "having" are intended to be inclusive and mean that there may be additional elements other than the listed elements.

This written description uses examples to disclose embodiments, including the best mode, and also to enable any person skilled in the art to practice the embodiments, including making and using any devices or systems and performing any incorporated methods. The patentable scope of the embodiments is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The subject matter described herein can be implemented in analog electronic circuitry, digital electronic circuitry, and/or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The invention claimed is:

1. A non-destructive testing (NDT) system, comprising:
a sensor;
a conduit section coupled to the sensor;
a screen configured to display the data from the sensor;
a probe driver comprising an input structure and a positioning element configured to position the conduit section, wherein the input structure is configured to actuate in response to a user input, and wherein upon actuation, the input structure generates a signal indicative of a positioning of the conduit section;
an articulating section coupled between the sensor and the conduit section and configured to position the sensor via a movement of a head end section; and
a processor configured to:
receive the signal indicative of a position of the conduit section; and
control one or more operations of the probe driver configured to operate the positioning element to orientate the conduit section in the position.

2. The NDT system of claim 1, wherein the positioning element comprises a motor and a wheel, wherein the motor is configured to drive the wheel.

3. The NDT system of claim 2, wherein the motor drives the wheel via a worm gear.

4. The NDT system of claim 1, wherein the probe driver is configured to rotate an inner housing of the probe driver in relationship to an outer housing of the probe driver causing the conduit section to rotate.

5. The NDT system of claim 1, wherein the probe driver comprises a second sensor configured to sense an amount of the conduit section passing through the probe driver.

6. The NDT system of claim 1, wherein the probe driver is coupled to the conduit section through a clamshell coupling, a pull through coupling, a pronged communicative coupling, or any combination thereof.

7. The NDT system of claim 1, wherein the input structure comprises a joystick, a digital pad, a control pad, 3D spatial mouse, one or more buttons, or any combination thereof.

8. The NDT system of claim 1, wherein the positioning element is configured to insert, remove, or rotate the conduit section in relationship with a starting position of the conduit section through coupling with the probe driver.

9. A probe driver, comprising:
a coupling configured to interface with a conduit section at a first position of the conduit section;
an input structure configured to actuate in response to a user input indicating a second position of the conduit section;
one or more positioning elements configured to reposition the conduit section to interface with the coupling at the second position of the conduit section in response to the user input; and a rotation mechanism configured to rotate an inner housing of the probe driver in relationship to an outer housing of the probe driver causing the conduit section to rotate.

10. The probe driver of claim 9, wherein the input structure comprises a joystick, a digital pad, a control pad, 3D spatial mouse, one or more buttons, or any combination thereof.

11. The probe driver of claim 9, wherein the one or more positioning elements comprise a wheel driven by a motor, a worm gear, a turning gear, a ribbed surface, a helical gear, a spur gear, a rack and pinion gear, or any combination thereof.

12. The probe driver of claim 9, comprising a sensor configured to measure a degree of rotation from the first position, from the second position, or from a reference point of the conduit section.

13. The probe driver of claim 9, comprising a sensor configured to sense an amount of the conduit section passing through the probe driver.

14. The probe driver of claim 13, comprising a communicative coupling, wherein the communicative coupling is configured to:
transmit a signal generated by actuation of the input structure in response to the user input;
receive a control signal in response to the signal generated by the actuation; and
transmit the control signal to the probe driver to position the conduit section into the second position.

15. A method, comprising:
receiving, via a probe driver, an indication of a positioning instruction based on a user input, wherein the positioning instruction corresponds to a direction to position a conduit section during an inspection; and
in response to the positioning instruction, changing, via the probe driver, one or more operations of the probe driver, wherein the changing of the one or more operations of the probe driver is configured to position the conduit section and includes enabling one or more rotation mechanisms configured to cause a rotation of an inner housing of the prove driver coupled to the conduit section in relationship to an outer housing of the probe driver to cause a rotation of the conduit section.

16. The method of claim 15, wherein the positioning instruction is configured to cause the conduit section to extend following an axis, to retract towards the probe driver following an opposite motion of an extension motion following the axis, to rotate about a circumference associated with the axis from a first position to a second position, or any combination thereof.

17. The method of claim 15, wherein the positioning instruction is based at least on an actuation of an input structure by the user input, wherein the input structure comprises a joystick, a digital pad, a control pad, 3D spatial mouse, one or more buttons, or any combination thereof.

18. The method of claim 15, comprising:
transmitting, via the probe driver, one or more sensed parameters from one or more sensors, wherein the one or more sensors are at least configured to measure a distance extended of the conduit section.

\* \* \* \* \*